United States Patent [19]

Yamamoto et al.

[11] Patent Number: 5,894,900

[45] Date of Patent: Apr. 20, 1999

[54] MOTOR VEHICLE WITH REAR CRAWLER BELTS

[75] Inventors: Takahiro Yamamoto; Kouichi Uchibaba, both of Kawagoe; Hajime Yoshimura, Tokyo, all of Japan

[73] Assignees: Honda Giken Kogyo Kabushiki Kaisha, Tokyo; The Ohtsu Tire & Rubber Co., Ltd., Osaka, both of Japan

[21] Appl. No.: 08/598,256

[22] Filed: Feb. 8, 1996

Related U.S. Application Data

[63] Continuation of application No. 08/216,168, Mar. 22, 1994, abandoned.

[30] Foreign Application Priority Data

Jun. 18, 1993 [JP] Japan ................................. 5-147678

[51] Int. Cl.⁶ .............................. B62D 55/02; B62D 55/24
[52] U.S. Cl. ........................... 180/9.36; 305/165; 305/185
[58] Field of Search .............................. 180/9.1, 9.21, 180/9.25, 9.26, 9.34, 9.36; 305/165, 170, 174, 185, 15, 19; 152/209 R, 209 B, 209 NT, 209 D

[56] References Cited

U.S. PATENT DOCUMENTS 3,533,663  10/1970  Pianalto ........................ 305/35 EB
5,330,019   7/1994  Cartwright ..................... 180/9.21

FOREIGN PATENT DOCUMENTS 3-108506  11/1991  Japan .

OTHER PUBLICATIONS

Steering and Suspension, 2nd Edition, 1983 John Remling—John Wiley & Sons (Publ) 605 Third Ave, New York, N.Y. 10158 p. 222, Left col., 2nd Paragraph.

*Primary Examiner*—Anne Marie Boehler
*Attorney, Agent, or Firm*—Ostrolenk, Faber, Gerb & Soffen, LLP

[57] ABSTRACT

A crawler motor vehicle includes a pair of crawler belts trained around drive rear wheels and idle wheels which are rotatably mounted on the motor vehicle body. The crawler motor vehicle also has a pair of front wheels having respective tires and rotatably mounted on the motor vehicle body such that the front wheels will be subject to a camber thrust in the same negative direction as the negative direction of a camber thrust applied to the crawler belts.

4 Claims, 4 Drawing Sheets

5,894,900

1

MOTOR VEHICLE WITH REAR CRAWLER BELTS

This application is a continuation of application Ser. No. 08/216,168, filed Mar. 22, 1994, now abandoned.

BACKGROUND OF THE INVENTION

1. Field of the Invention

The present invention relates to a motor vehicle having front and rear wheels with tires and crawler belts trained around the rear wheels.

2. Description of the Prior Art

Japanese laid-open utility model publication NO. 3-108506 discloses a known crawler motor vehicle having steerable front wheels and flexible drive crawler belts. The flexible drive crawler belts are trained around rear wheels and idle wheels positioned adjacent to the respective rear wheels. The flexible drive crawler belts are suitable for running on paved roads and rough terrain.

SUMMARY OF THE INVENTION

It is an object of the present invention to provide a motor vehicle with drive crawler belts trained around rear wheels and idle wheels, which has an improved ability to run straight ahead stably and improved maneuverability when running along grooved trails on the road or rough terrain.

According to the present invention, there is provided a motor vehicle comprising a motor vehicle body, a pair of drive rear wheels rotatably mounted on said motor vehicle body, a pair of crawler belts trained around said drive rear wheels, respectively, and a pair of front wheels having respective tires and rotatably mounted on said motor vehicle body such that the front wheels will be subject to a camber thrust in the same direction as the direction of a camber thrust applied to said crawler belts. Preferably, the front wheels may be rotatably mounted on said motor vehicle body such that the front wheels will be subject to a camber thrust in a negative direction.

Since the camber thrusts are applied to the front wheels and the crawler belts in the same direction, while the motor vehicle is running along grooved trails on the road, any yawing moment exerted to change the direction of the motor vehicle is small, and hence the motor vehicle can run straight ahead stably.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
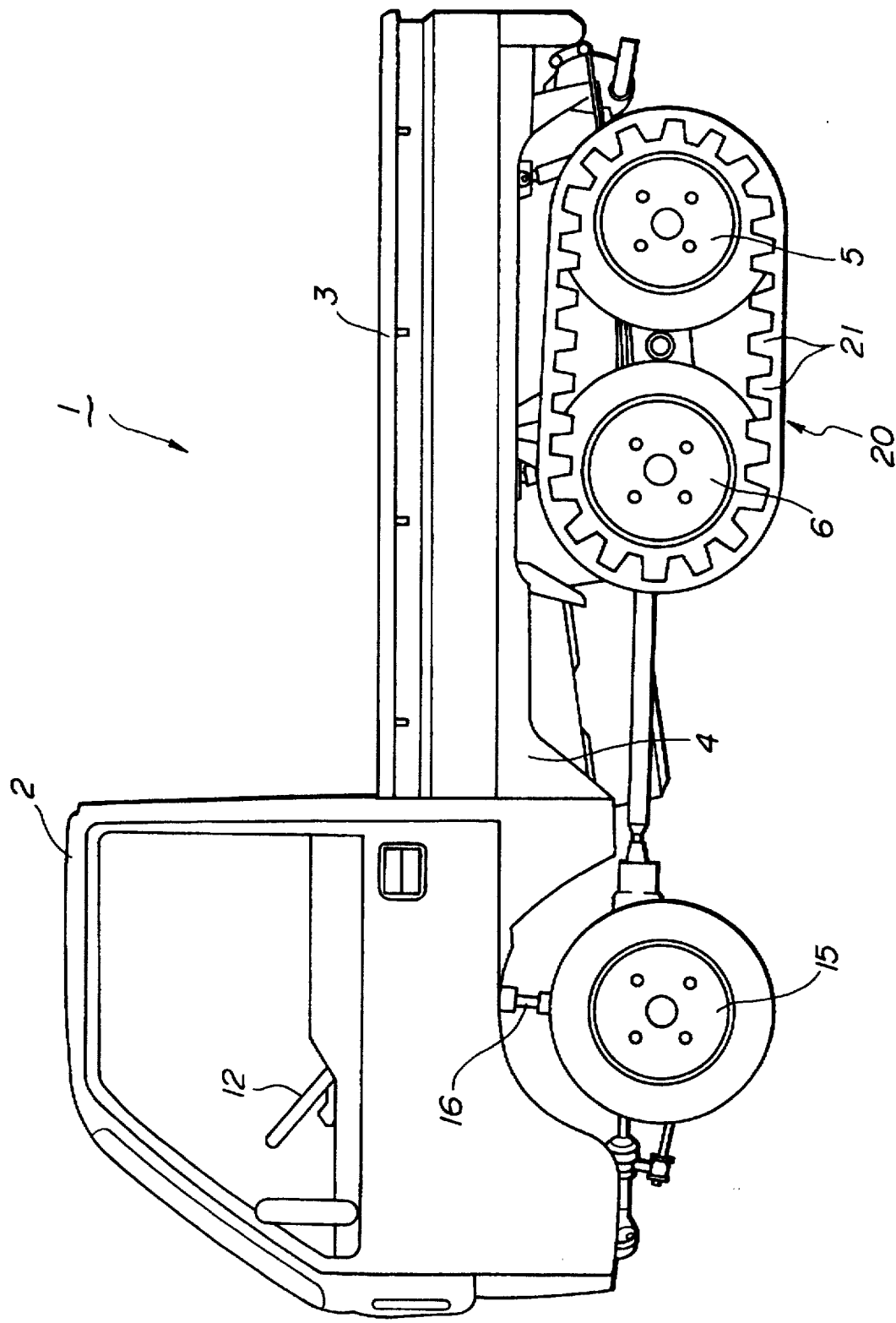
FIG. 1 is a side elevational view of a motor vehicle with rear crawler belts according to the present invention.

As shown in FIG. 1, a motor vehicle 1 according to the present invention is in the form of a light truck, for example,

2 which generally comprises a motor vehicle body 4 including a cabin 2 and a cargo floor 3.

Figure 2:
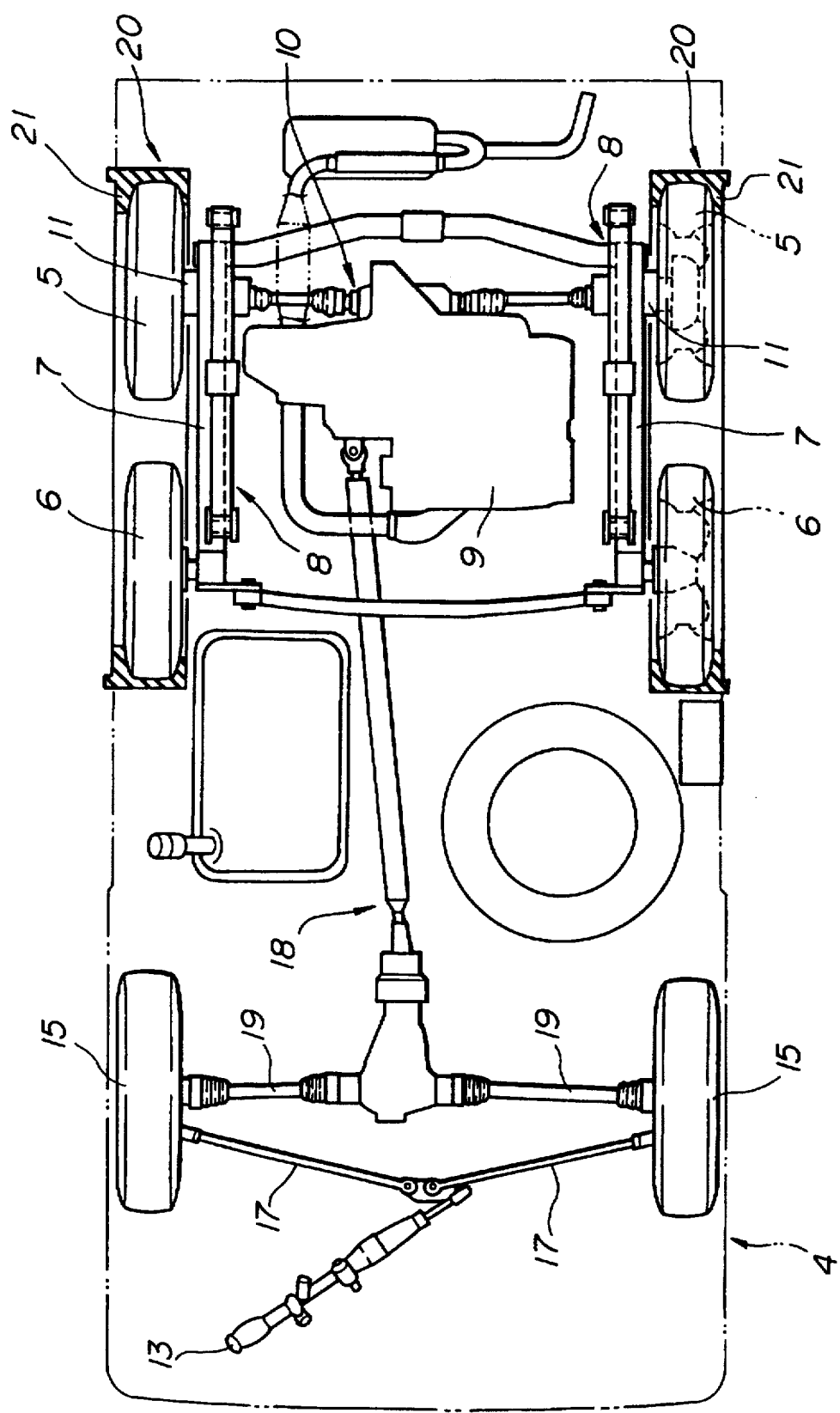
FIG. 2 is a bottom plan view, partly in cross section, of front, rear, and idle wheels and crawler belts of the motor vehicle shown in FIG. 1.

As also shown in FIG. 2, the motor vehicle 1 has a pair of laterally spaced drive rear wheels 5, a pair of laterally spaced steerable front wheels 15, and a pair of laterally spaced idle wheels 6 interposed between the rear and front wheels 5, 15 and positioned adjacent to the rear wheels 5.

The wheels 5, 6, 15 have respective pneumatic tires of rubber. The motor vehicle 1 also includes a pair of laterally spaced flexible crawler belts 20 trained around respective sets of the rear and idle wheels 5, 6. The crawler belts 20 are made of a flexible material such as an elastomeric material such as rubber or the like. Each of the crawler belts 20 has an array of tooth-shaped side guides 21 projecting on each of its outer side edges.

As shown in FIG. 2, the sets of the rear and idle wheels 5, 6 are supported on a pair of laterally spaced swing beams 7 independently supported on the motor vehicle body 4 by respective rear suspensions 8. The motor vehicle 1 has an engine 9 mounted on the motor vehicle body 4 underneath the cargo floor 3. The engine 9 has a built-in transmission for transmitting rotational power to a rear wheel drive unit 10 that is operatively coupled to the rear wheels 5 to transmit the rotational power through respective rear drive axles 11 to the rear wheels 5.

The front wheels 15 are independently supported on the motor vehicle body 4 by respective front suspensions 16 (see FIG. 1), and operatively coupled to respective tie rods 17 which are connected to a steering wheel 12 through a steering shaft 13 (see FIG. 2). The rotational power from the transmission can also be transmitted to the front wheels 15 through a front wheel drive unit 18 including a drive shaft and respective front drive axles 19.

Figure 3:
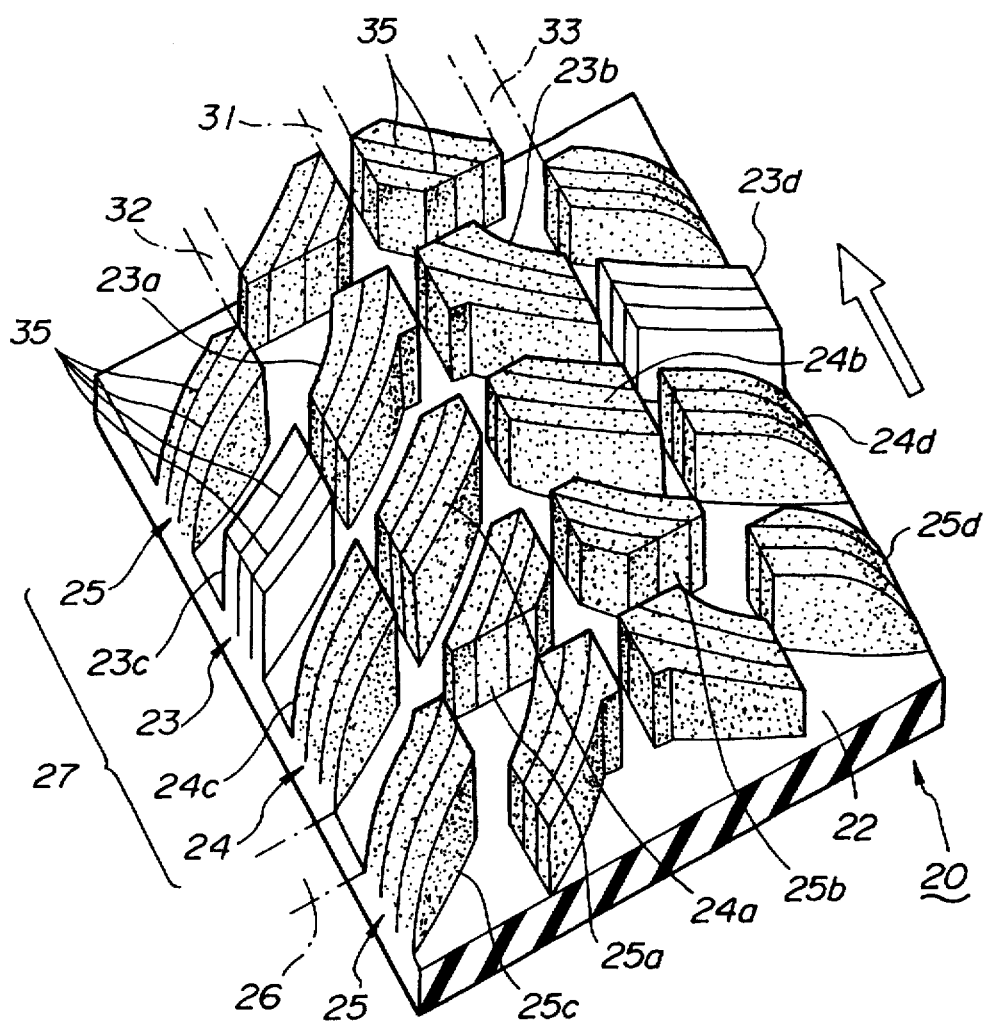
FIG. 3 is an enlarged fragmentary perspective view of each of the crawler belts.

FIG. 3 fragmentarily shows each of the crawler belts 20 at an enlarged scale.

As shown in FIG. 3, the crawler belt 20 has an elongate belt body 22, which is of an endless configuration as shown in FIG. 1, supporting on its ground contact side a plurality of alternate series of first, second, and third substantially chevron-shaped, or inverted V-shaped, flatcrest ridges 23, 24, 25 that are successively arranged at predetermined intervals in the longitudinal direction indicated by the blank arrow in which the crawler belt 20 moves i.e., the direction of motion. The chevron-shaped ridges 23, 24, 25 point toward the longitudinal direction indicated by the blank arrow each chevron shape having a point at one end and a tail at the opposite end. Adjacent the chevron-shaped ridges 23, 24, 25 overlap each other, i.e., the central point of one of the chevron-shaped ridge enters between the diagonal stripes of the other chevron-shaped ridge, by a distance which is about half the extent of each of the chevron-shaped ridges 23, 24, 25 in the longitudinal direction of the crawler belt 20.

The chevron-shaped ridges 23, 24, 25 are grouped into a plurality of block areas 27 each composed of a plurality or groups of, e.g., three, chevron-shaped ridges minor chevrons separated 23, 24, 25 separated by transverse narrow grooves or open areas 26 extending across the crawler belt 20 each three minor chevrons forming one major chevron having a point in said direction of motion and an opposite end tail. Each of the chevron-shaped ridges 23, 24, 25 is divided into four segments by three longitudinal grooves, i.e., a central groove 31 and two lateral grooves 32, 33, extending in the longitudinal direction of the crawler belt 20.

More specifically, each of the first chevron-shaped ridges 23 is composed of two central segments 23a, 23b transversely separated from each other by and shaped symmetrically with respect to the central groove 31, and two end segments 23c, 23d transversely separated from the central segments 23a, 23b by the lateral grooves 32, 33 shaped symmetrically with respect to the central groove 31. Similarly, each of the second chevron-shaped ridges 24 is composed of two central segments 24a, 24b transversely separated from each other by and shaped symmetrically with respect to the central groove 31, and two end segments 24c, 24d transversely separated from the central segments 24a, 24b by the lateral grooves 32, 33 shaped symmetrically with respect to the central groove 31. Each of the third chevron-shaped ridges 25 is composed of two central segments 25a, 25b transversely separated from each other by and shaped symmetrically with respect to the central groove 31, and two end segments 25c, 25d transversely separated from the central segments 25a, 25b by the lateral grooves 32, 33 shaped symmetrically with respect to the central groove 31.

In each of the block areas 27, the first chevron-shaped ridge 23, the second chevron-shaped ridge 24, and the third chevron-shaped ridge 25 are successively arranged in the order named in the longitudinal direction of the crawler belt 20. However, the central segments 25a, 25b and the end segments 25c, 25d of the third chevron-shaped ridge 25 are also separated from each other by one of the transverse grooves 26, and only the end segments 25c, 25d belong to an adjacent block area 27.

The end segments 23c, 23d of the first chevron-shaped ridges 23 have a rectangular cross-sectional shape, including a rectangular edge, in the transverse direction of the crawler belt 20. The end segments 24c, 24d, 25c, 25d of the second and third chevron-shaped ridges 24, 25 have an arcuate cross-sectional shape, including an arcuate or sectorial edge, in the transverse direction of the crawler belt 20.

The end segments 23c, 23d of rectangular cross section and the end segments 24c, 24d, 25c, 25d of arcuate cross section are successively arranged in the longitudinal direction of the crawler belt 20.

The central segments, 23a, 23b, 24a, 24b, 25a, 25b have a rectangular cross-sectional shape, including a rectangular edge.

Each of the segments 23a–23d, 24a–24d, 25a–25d has two spaced slits or sipes 35 defined therein in a direction normal to the ground contact side of the crawler belt 20. The sipes 35 of each of the first, second, and third chevron-shaped ridges 23, 24, 25 are collectively shaped as a chevron within the chevron of the ridge, i.e., extend collectively in the longitudinal direction of the ridge transversely across the crawler belt 20 and substantially perpendicularly to the direction in which the crawler belt 20 runs. The sipes 35 make the segments 23a–23d, 24a–24d, 25a–25d and hence the first, second, and third chevron-shaped ridges 23, 24, 25 flexibly deformable in the longitudinal direction of the crawler belt 20.

Figure 4:
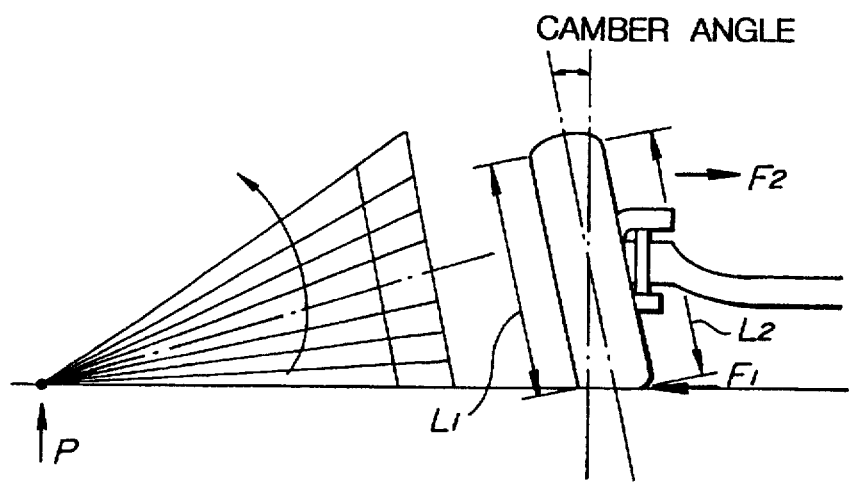
FIG. 4 is a schematic view showing a camber angle of a wheel and a camber thrust imposed on the wheel.

When the motor vehicle 1 runs on a road, it is presumed that the crawler belts 20 trained around the drive rear wheels 5 and the idle wheels 6 are subject to a camber thrust in a negative direction for the following reasons:

As shown in FIG. 4, a wheel with camber tends to make a circular motion about a point P of intersection between an extension of the axis of the wheel and the ground surface. While the wheel is making such a circular motion under a radially inward force $F_1$, a radially outward force $F_2$ is generated tending to recover the wheel from the inclined angular position having a camber angle back to an angular position perpendicular to the road surface. The difference between these forces $F_1$, $F_2$ is defined as a camber thrust. The camber thrust is applied in a positive direction if $F_1 - F_2 > 0$, and a negative direction if $F_1 - F_2 < 0$. If the wheel has a bias ply tire which is of low tread rigidity and has diagonal cords, the bias ply tire is liable to flex to a degree commensurate with the camber angle, i.e., the difference between outer and inner tire diameters L1, L2 is relatively large, resulting in a relatively large force $F_1$ and a relatively small force $F_2$. Therefore, the bias ply tire is subject to a relatively large positive camber thrust. If the wheel has a radial ply tire which is of high tread rigidity and has circumferential steel cords, the radial ply tire tends to flex to a smaller degree, i.e., the difference between the outer and inner tire diameters L1, L2 is relatively small. The radial ply tire thus undergoes a relatively small force $F_1$ and a relatively large force $F_2$, and is subjected to a relatively large negative camber thrust. Generally, tires with a high tread rigidity are subject to large forces $F_2$. Crawler belts of rubber have a number of circumferential steel cords, as with the radial ply tires. Therefore, even when a crawler belt has a camber angle, the outer and inner diameters L1, L2 thereof are substantially the same as each other, resulting in a force $F_1$ which is close to zero. Furthermore, since the crawler belts have cores perpendicular to the steel cords, they have a high tread rigidity and hence are subject to a large force $F_2$. As a consequence, the crawler belts undergo a relatively large negative camber thrust.

The front wheels 15 are mounted on the motor vehicle body 4 such that they are subject to a camber thrust in the same direction as the direction of the camber thrust applied to the crawler belt 20 when the motor vehicle 15 is running.

Figure 5:
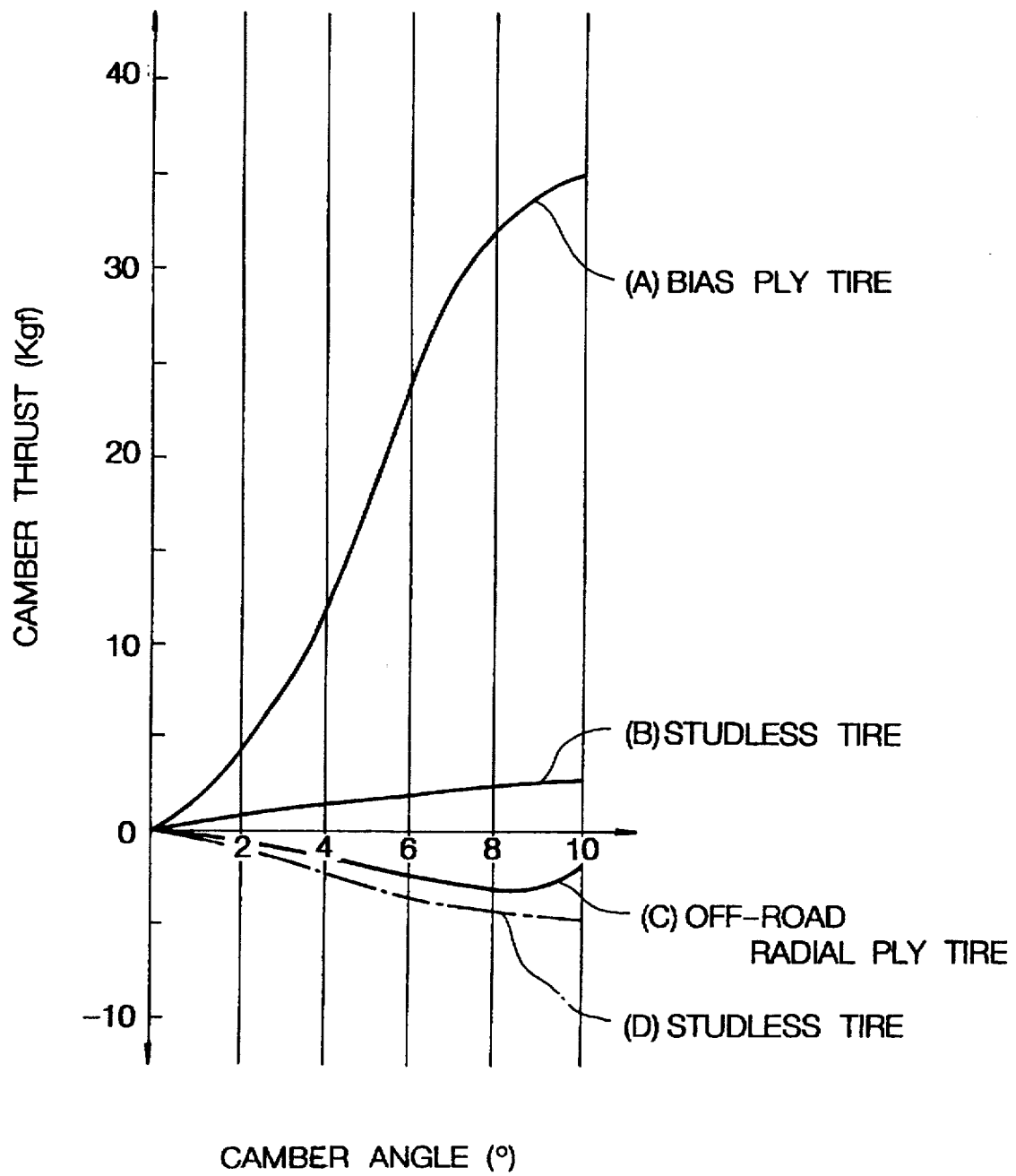
FIG. 5 is a diagram showing the relationship between camber angles and camber thrusts on different tires based on the definition shown in FIG. 4.

FIG. 5 shows the relationship between camber angles and camber thrusts on different tires based on the definition shown in FIG. 4. The camber thrusts shown in FIG. 5 were obtained when the camber angles of a bias ply tire (A), a studless tire (B), an off-road radial ply tire (C), and a studless tire (D), which had different characteristics, including tread patterns and rigidities, were varied. The pneumatic pressure in each of the tires (A)–(D) was 2 Kg/cm$^2$, the wheel load imposed on each of the tires (A)–(D) was 180 Kg, and motor vehicles equipped with these tires ran at a speed of 50 km/h. It can be seen from FIG. 5 that the camber thrusts on some tires are not necessarily positive, but may be negative depending on the type and characteristics of the tires.

Each of the tires (A)–(D) was used as the front wheels 15 and a running test was conducted on the motor vehicle 1 with the crawler belts 20 trained around the rear wheels 5 and the idle wheels 6 for maneuverability evaluation. The results of the running test are given in Table below.

In Table, the maneuverability evaluation represents the ease with which the steering wheel 12 can be operated under certain running conditions, and is measured according to evaluation points up to 10. The maneuverability evaluation is "good" when the evaluation point is 6 or higher, "fair" when the evaluation point is 5, and "poor" when the evaluation point is 4 or lower.

TABLE

| No. | Tire Type | Running Conditions | Evaluation point | Maneuverability evaluation |
| --- | --- | --- | --- | --- |
| 1 | (A) | Ran on pavement trails | 4.5 | poor |
| 2 | (B) | Ran on hard-packed-snow trails | 5 | fair |
| 3 | (C) | Ran on pavement trails | 6 | good |
| 4 | (D) | Ran on hard-packed-snow trails | 6 | good |

The test results shown in Table, given above, indicates that when the motor vehicle 1 ran on trails, the motor vehicle 1 with the off-road radial ply tire (C) or the studless tire (D), which is subject to a negative camber thrust, on each of the front wheels 15 had the better ability to run straight ahead stably, and could run straight ahead and be maneuvered with a light manual steering action. When the motor vehicle 1 with the bias ply tire (A), which is subject to a positive camber thrust, on each of the front wheels 15 ran on trails, a large yawing moment was applied to the motor vehicle 1, tending to turn the motor vehicle 1 laterally about its vertical axis, it was necessary to steer the motor vehicle 1 at all times in order to keep the motor vehicle 1 running straight ahead, and hence the maneuverability of the motor vehicle 1 was poor.

Therefore, it can be seen from the test results that the motor vehicle 1 with the off-road radial ply tire (C) or the studless tire (D) on each of the front wheels 15 is capable of running straight ahead stably, i.e., yawing moments imposed on the motor vehicle 1 were minimized, when the motor vehicle ran on trails. This indicates that such an ability of the motor vehicle 1 to run straight ahead stably can be achieved because the camber thrust on the front wheels 15 is applied in the same direction as the camber thrust on the crawler belts 20.

Consequently, where the front wheels 15 are installed such that they are subject to a camber thrust in the same negative direction as the direction of the camber thrust applied to the crawler belt 20, yawing moments imposed to change the direction of the motor vehicle 1 when the motor vehicle 1 runs on trails are minimized, and the motor vehicle 1 can run stably straight ahead with improved maneuverabilty.

The crawler motor vehicle 1 equipped with the crawler belts 20 is not limited to the illustrated light truck with six wheels including rear drive wheels. The crawler belts according to the present invention are also usable on any of various other crawler motor vehicles.

The crawler belts 20 may be made of another flexible material such as plastic or the like, rather than rubber.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A motor vehicle comprising:

a motor vehicle body having opposite sides;

a pair of rear drive wheels rotatably mounted one on each side of said motor vehicle body;

a pair of crawler belts, each trained around one of said pair of rear drive wheels, respectively;

each of said crawler belts having a high tread rigidity capable of producing a camber thrust acting in a first direction; and a pair of front wheels having respective tires and rotatably mounted on said opposite sides of said motor vehicle body, each tire having a high tread rigidity capable of producing a camber thrust acting in said same first direction, wherein each of said crawler belts comprises an endless belt base part and a tread comprising a plurality of ridges extending transversely outward from the base part, the tread comprising a pattern of major chevrons at predetermined intervals spaced along the belt in the direction of motion of the belt, each major chevron defined by three minor chevrons spaced apart successively in the direction of the belt's motion, each minor chevron comprising four ridges defining an inverted V having a point pointing in the direction of the belt's motion and a tail at the opposite end.

2. A motor vehicle according to claim 1 and operable on a surface having an inclination in a particular direction rightward or leftward of the direction of forward motion, wherein each of said crawler belts has a high tread rigidity capable of producing a camber thrust acting in a direction opposite to the direction of inclination of said crawler belts with respect to the perpendicular to a ground plane during forward movement of said motor vehicle, and each of said tires has a high tread rigidity capable of producing a camber thrust acting in a direction opposite to the direction of inclination of a corresponding one of said front wheels with respect to the perpendicular to said ground plane during forward movement of said motor vehicle.

3. A motor vehicle according to claim 1, wherein each major chevron is separated from adjacent major chevrons by an open area without ridges extending across the belt in a direction transverse of the belt's direction of motion.

4. A motor vehicle according to claim 1 wherein said major chevrons are spaced apart from each other, and each major chevron has a point and a tail, and the point of each major chevron is situated within the tail of the next major chevron in the direction of the belt's motion.

* * * * *